US009783197B2

(12) United States Patent
Aoki et al.

(10) Patent No.: US 9,783,197 B2
(45) Date of Patent: Oct. 10, 2017

(54) DRIVING SUPPORT DEVICE

(71) Applicant: HONDA MOTOR CO., LTD., Minato-ku, Tokyo (JP)

(72) Inventors: Tomoyoshi Aoki, Shioya-gun (JP); Sachio Kobayashi, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 15/083,437

(22) Filed: Mar. 29, 2016

(65) Prior Publication Data

US 2016/0288790 A1    Oct. 6, 2016

(30) Foreign Application Priority Data

Mar. 31, 2015  (JP) ................. 2015-070576

(51) Int. Cl.
| *A01B 69/00* | (2006.01) |
| *B60W 30/165* | (2012.01) |
| *G06K 9/00* | (2006.01) |
| *B60W 10/04* | (2006.01) |
| *B60W 10/184* | (2012.01) |
| *B60W 10/20* | (2006.01) |

(Continued)

(52) U.S. Cl.
CPC .......... *B60W 30/165* (2013.01); *B60W 10/04* (2013.01); *B60W 10/184* (2013.01); *B60W 10/20* (2013.01); *B60W 30/10* (2013.01); *B60W 30/12* (2013.01); *B60W 30/16* (2013.01); *G06K 9/00798* (2013.01); *G06K 9/00825* (2013.01)

(58) Field of Classification Search
USPC ........................................... 701/41
See application file for complete search history.

(56) References Cited

U.S. PATENT DOCUMENTS 7,617,037 B2    11/2009  Desens et al.
8,279,280 B2    10/2012  Kim et al.
(Continued)

FOREIGN PATENT DOCUMENTS

DE         101 59 658 A1    6/2003
DE    10 2006 058 412 A1    6/2008
(Continued)

OTHER PUBLICATIONS

Office Action dated Jul. 5, 2016 issued over the corresponding Japanese Patent Application No. 2015070576 with the English translation of pertinent portion.

(Continued)

*Primary Examiner* — Tyler D Paige
(74) *Attorney, Agent, or Firm* — Carrier Blackman & Associates, P.C.; Joseph P. Carrier; Jeffrey T. Gedeon

(57) ABSTRACT

A trajectory tracking control unit carries out a trajectory tracking control in the event that a predetermined condition is satisfied. On the other hand, in the case that a preceding vehicle recognizing unit detects that a preceding vehicle has moved in a vehicle transverse direction, the trajectory tracking control unit predicts that the preceding vehicle will depart from a lane in which it is traveling. Therefore, even if the predetermined condition is satisfied after the preceding vehicle recognizing unit has detected that the preceding vehicle has moved in the vehicle transverse direction, the trajectory tracking control unit does not cause the driver's own vehicle to follow the trajectory of the preceding vehicle.

5 Claims, 5 Drawing Sheets

(51) Int. Cl.
*B60W 30/10* (2006.01)
*B60W 30/12* (2006.01)
*B60W 30/16* (2012.01)

(56) References Cited

U.S. PATENT DOCUMENTS

| | | | |
|---|---|---|---|
| 2003/0120414 A1* | 6/2003 | Matsumoto | B60K 31/0008 |
| | | | 701/96 |
| 2004/0061626 A1* | 4/2004 | Kubota | B60K 31/0008 |
| | | | 701/96 |
| 2008/0147249 A1* | 6/2008 | Kuge | B60W 50/10 |
| | | | 701/1 |
| 2010/0246889 A1* | 9/2010 | Nara | G06K 9/00798 |
| | | | 382/104 |
| 2011/0231095 A1* | 9/2011 | Nakada | B60W 30/12 |
| | | | 701/301 |
| 2013/0085976 A1* | 4/2013 | Bone | B60W 30/18163 |
| | | | 706/46 |
| 2013/0253767 A1* | 9/2013 | Lee | B60W 50/04 |
| | | | 701/42 |
| 2015/0235140 A1* | 8/2015 | Rothermel | G06N 5/048 |
| | | | 706/52 |
| 2015/0336607 A1* | 11/2015 | Inoue | B60W 40/114 |
| | | | 701/41 |

FOREIGN PATENT DOCUMENTS

| | | |
|---|---|---|
| DE | 10 2009 045 682 A1 | 9/2010 |
| JP | 2004-078333 A | 3/2004 |
| JP | 2004206275 A | 7/2004 |
| JP | 2005-332192 A | 12/2005 |
| JP | 2007186096 A | 7/2007 |
| JP | 2012003418 A | 1/2012 |

OTHER PUBLICATIONS

Search Report dated Jan. 13, 2017 over the corresponding DE Patent Application No. 102016205188.1 with the English translation thereof.

Office Action dated Jan. 13, 2017 over the corresponding DE Patent Application No. 102016205188.1 with the English translation thereof.

* cited by examiner

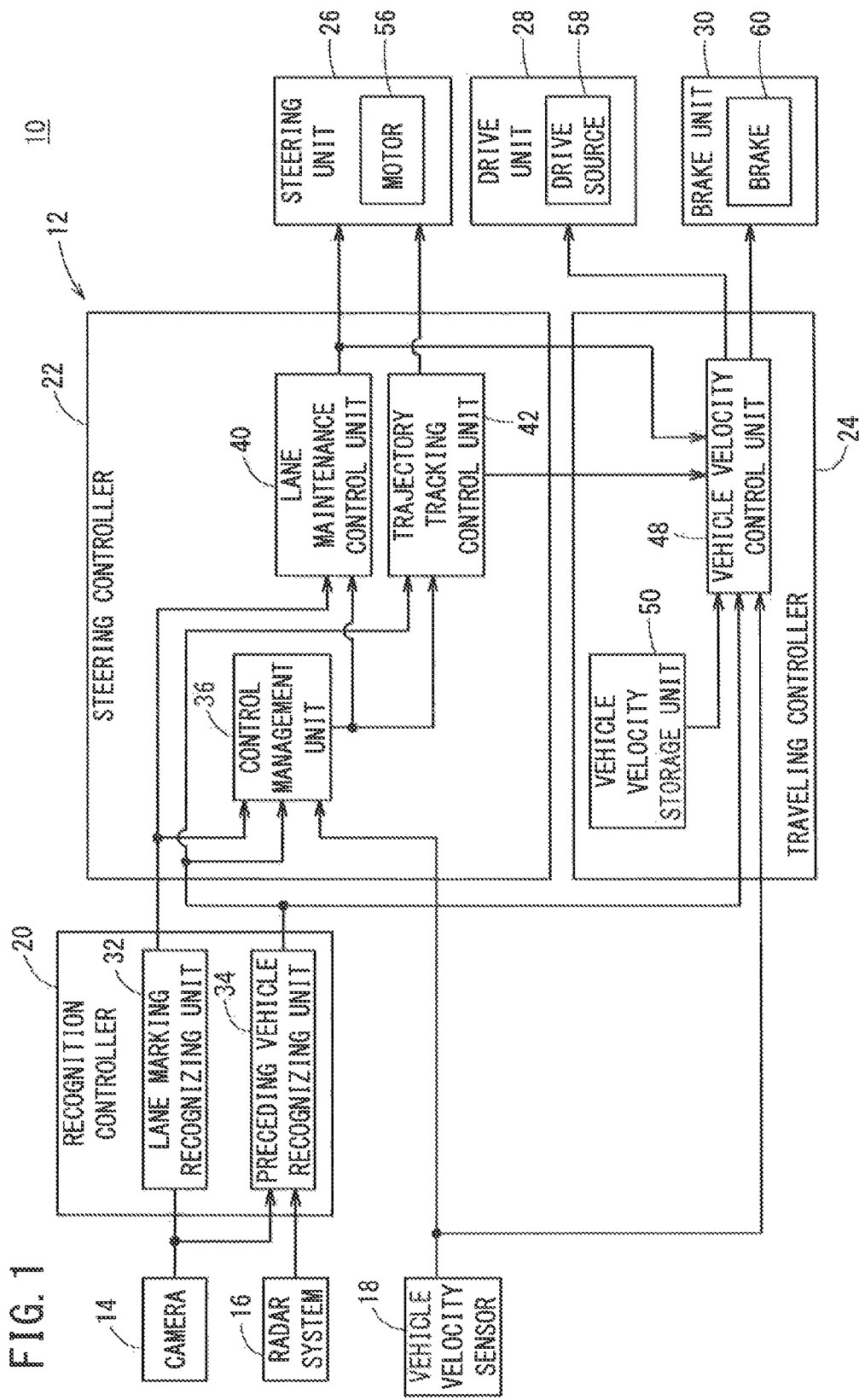

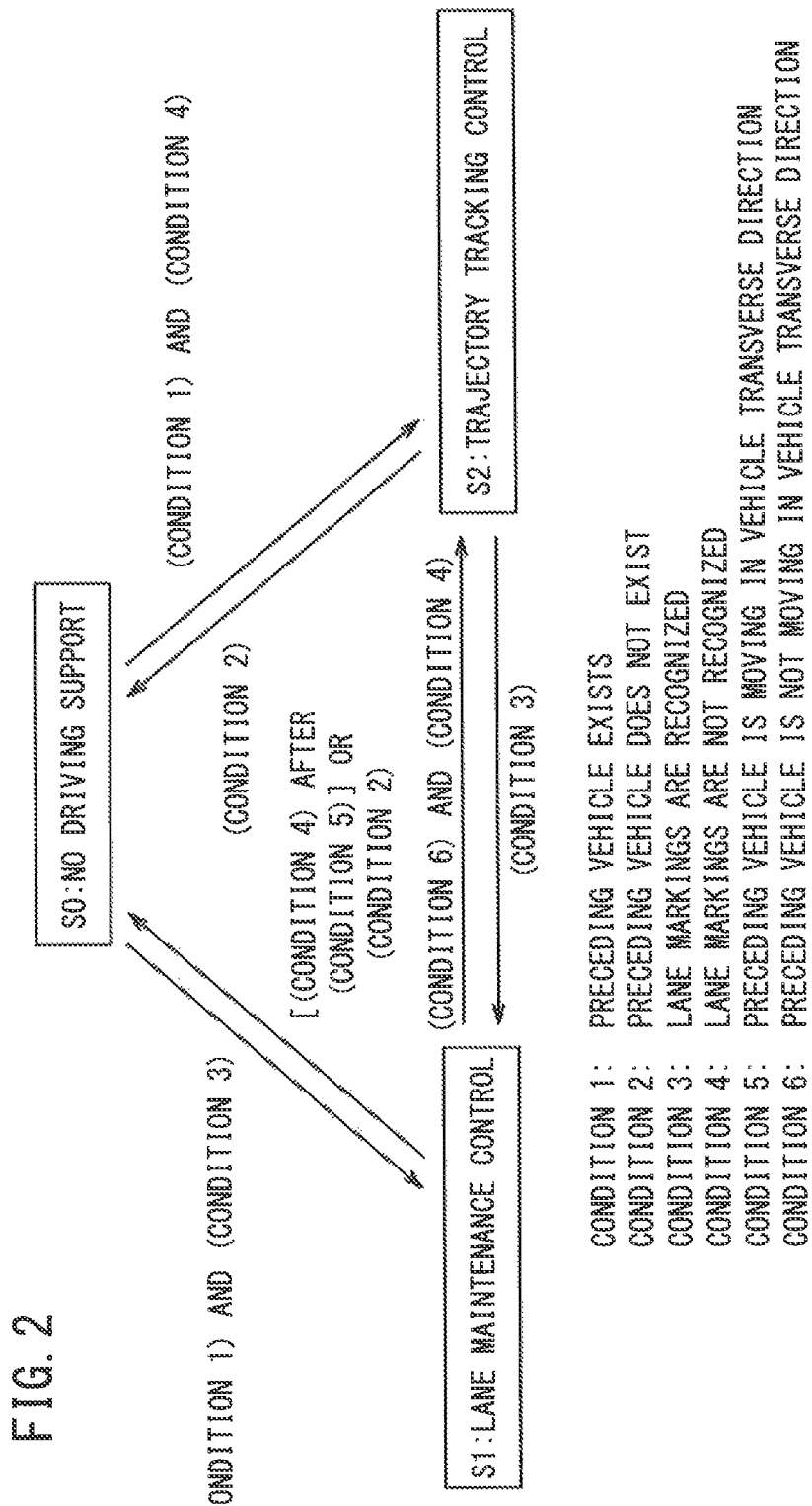

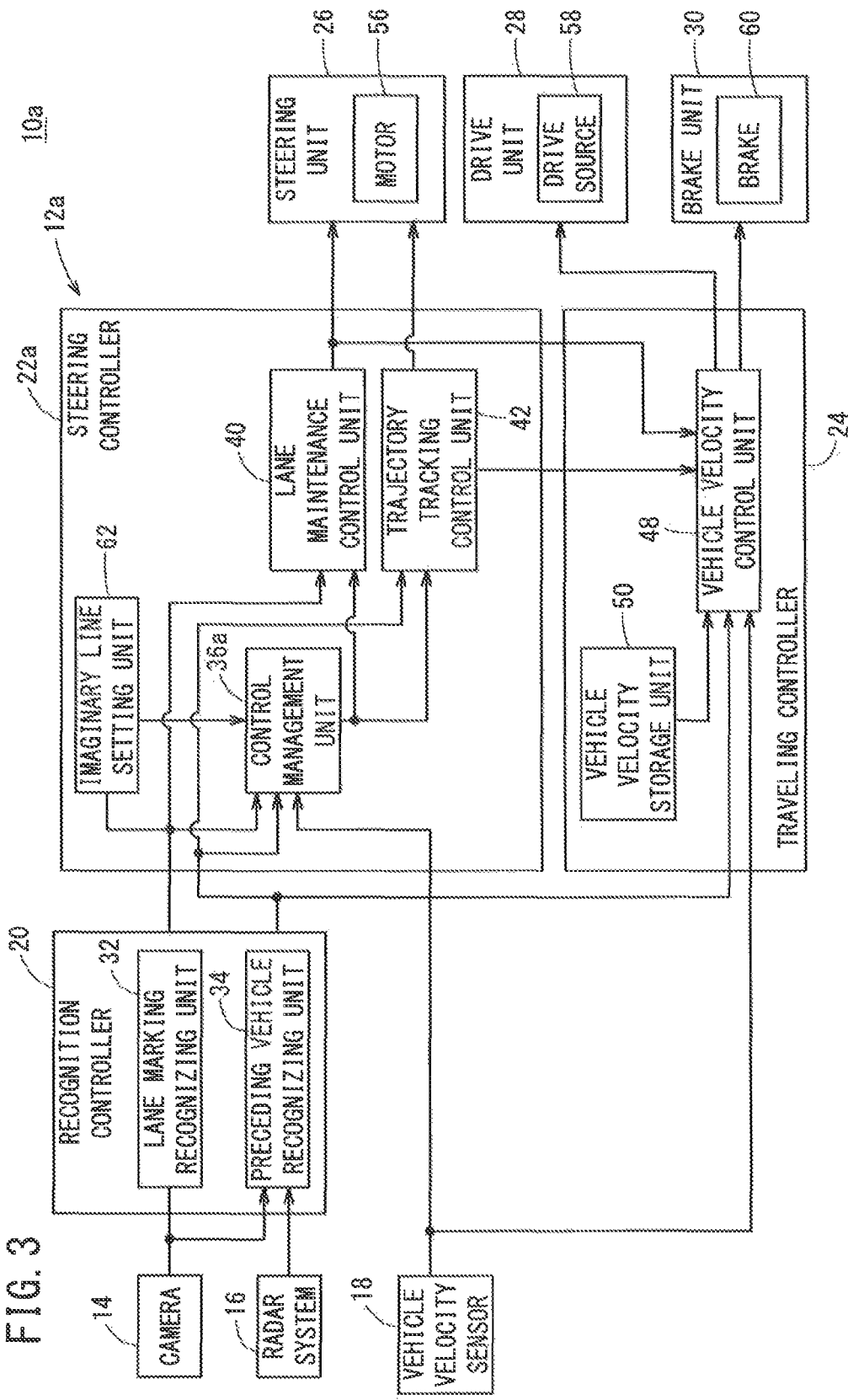

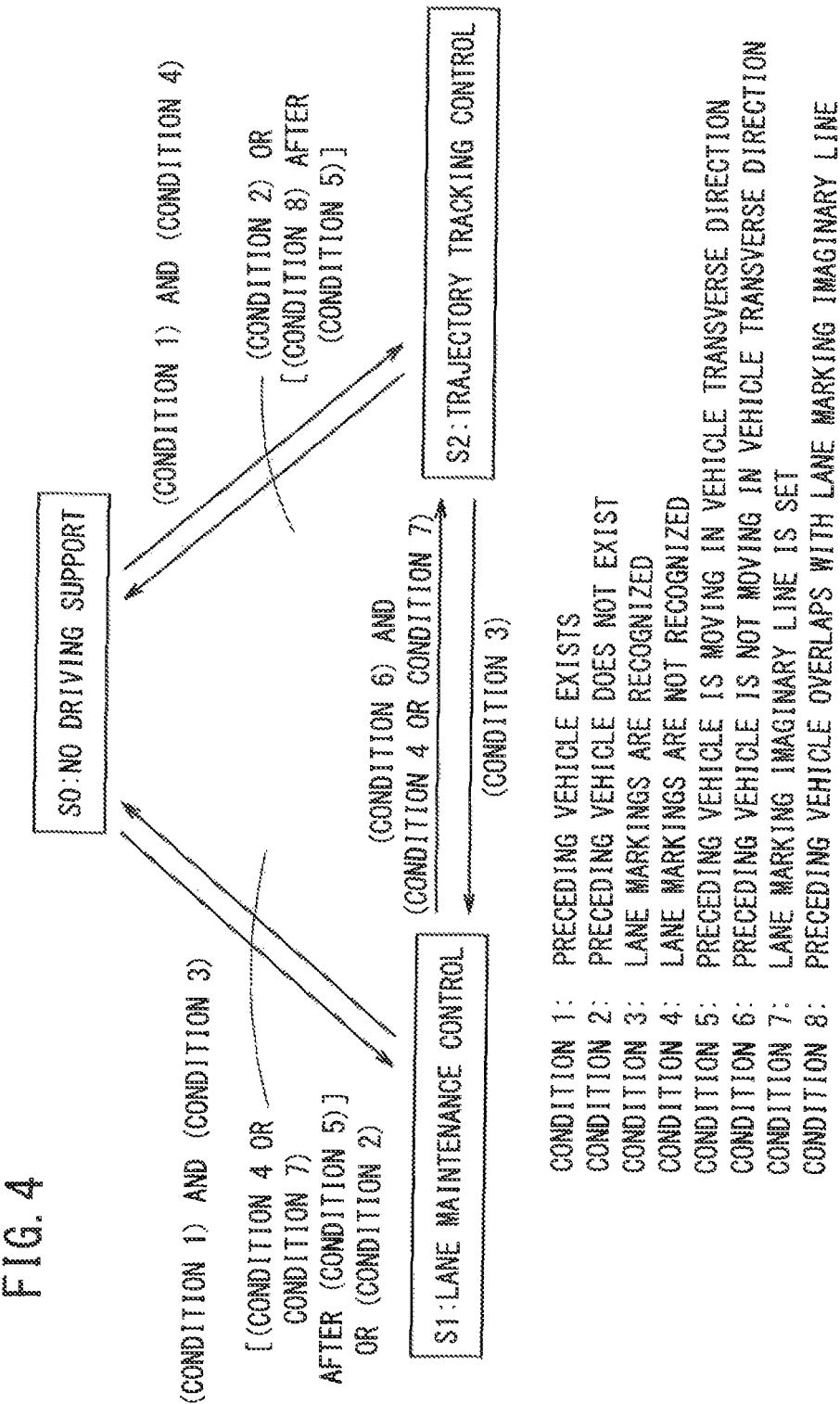

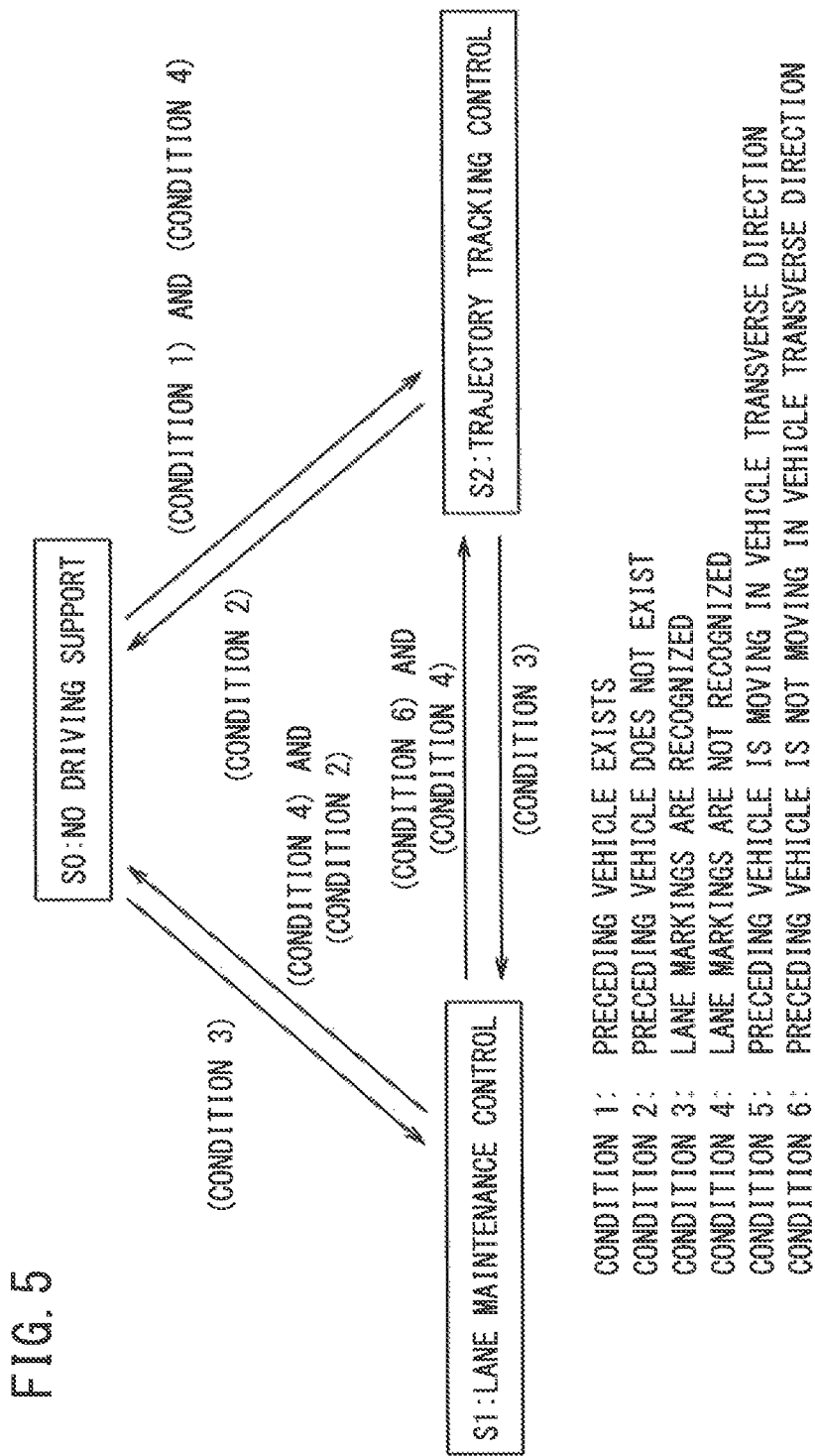

DRIVING SUPPORT DEVICE

CROSS-REFERENCE TO RELATED APPLICATION

This application is based upon and claims the benefit of priority from Japanese Patent Application No. 2015-070576 filed on Mar. 31, 2015, the contents of which are incorporated herein by reference.

BACKGROUND OF THE INVENTION

Field of the Invention

The present invention relates to a driving support device for performing driving assistance of a vehicle.

Description of the Related Art

There are two types of known vehicle support controls, for example. One of them, which is referred to as a lane keep control, is a driving support control (hereinafter also referred to as a lane maintenance control) that maintains a driver's own vehicle within a vehicle lane along lane markings. The other is a driving support control (hereinafter also referred to as a trajectory tracking control) that causes the driver's own vehicle to follow the trajectory of a preceding vehicle.

Japanese Laid-Open Patent Publication No. 2004-078333 discloses that a lane maintenance control is carried out in the event it is detected that a lane change or a lane deviation of a preceding vehicle has occurred, premised on recognition by a driving support control of lane markings and a preceding vehicle. Further, Japanese Laid-Open Patent Publication No. 2005-332192 discloses that a lane maintenance control and a trajectory tracking control are carried out. More specifically, in the case that a preceding vehicle is traveling at a distance separated from a driver's own vehicle, based on lane markings, a target travel trajectory of the driver's own vehicle is set, and in the case that the preceding vehicle travels near to the driver's own vehicle, the target trajectory of the driver's own vehicle is set based on the position of the preceding vehicle.

SUMMARY OF THE INVENTION

In Japanese Laid-Open Patent Publication No. 2004-078333, it is disclosed that a lane maintenance control is carried out in the case of detection of a lane change or a lane deviation (hereinafter referred to collectively as a lane deviation) of a preceding vehicle. In the case of a lane deviation, the preceding vehicle crosses or straddles over the lane markings temporarily. At such a time, the driver's own vehicle cannot carry out recognition of the lane markings. According to Japanese Laid-Open Patent Publication No. 2004-078333, no consideration is presented concerning how the driver's own vehicle would be controlled in the case that the lane markings cannot be recognized accompanying a lane deviation of the preceding vehicle.

On the other hand, in Japanese Laid-Open Patent Publication No. 2005-332192, it is disclosed that, in case it is predicted that it will become impossible to recognize the lane markings, a trajectory tracking control is carried out. However, when such a control is performed, the driver's own vehicle follows the preceding vehicle, and as a result, makes an unnecessary lane deviation.

The present invention has been devised taking into consideration the aforementioned problems, and has the object of providing a driving support device, which enables a driver's own vehicle to be controlled appropriately by accurately and reliably recognizing that a preceding vehicle, which serves as a trajectory tracking object, is undertaking a lane deviation.

The present invention is characterized by a driving support device including a preceding vehicle recognizing unit configured to recognize a preceding vehicle, and a trajectory tracking control unit configured to, in a case that a predetermined condition is satisfied, control a driver's own vehicle so as to follow the trajectory of the preceding vehicle that has been recognized by the preceding vehicle recognizing unit, wherein, even if the predetermined condition is satisfied after the preceding vehicle recognizing unit has detected that the preceding vehicle has moved in a vehicle transverse direction, the trajectory tracking control unit does not cause the driver's own vehicle to follow the trajectory of the preceding vehicle. In this manner, in the present invention, based on a movement of the preceding vehicle performed when the preceding vehicle makes a lane deviation, i.e., based on movement of the preceding vehicle in the vehicle transverse direction, it is predicted that the preceding vehicle will make a lane deviation. In addition, in the case that a lane deviation of the preceding vehicle is predicted, even if a predetermined condition for carrying out the trajectory tracking control has been satisfied, trajectory tracking is not actually carried out. According to the present invention, the preceding vehicle undertaking a lane deviation can accurately and reliably be recognized, and the driver's own vehicle can be made not to follow the preceding vehicle that is making the lane deviation.

In the present invention, there may further be included a lane marking recognizing unit configured to recognize a lane marking of a lane in which the driver's own vehicle travels, wherein the predetermined condition is that the lane marking is no longer recognized by the lane marking recognizing unit. For example, when the lane maintenance control is being carried out premised on recognition of the preceding vehicle, if the lane markings are no longer recognized, then the driver's own vehicle transitions to the trajectory tracking control. However, in the case that the reason as to why the lane markings are no longer recognized is because the lane markings are straddled over accompanying the lane deviation of the preceding vehicle, if the driver's own vehicle were to transition to the trajectory tracking control, the driver's own vehicle also would undertake a lane deviation. According to the present invention, if the preceding vehicle moves in the vehicle transverse direction before the lane markings can no longer be recognized, it is predicted that the preceding vehicle will deviate from the lane. In this manner, according to the present invention, the preceding vehicle undertaking a lane deviation can accurately and reliably be recognized, and the driver's own vehicle can be made not to follow the preceding vehicle that is making the lane deviation.

In the present invention, there may further be included an imaginary line setting unit configured to, in the case that the predetermined condition is satisfied, set a lane marking imaginary line to the vehicle transverse direction in which the preceding vehicle moves. In this case, even if the predetermined condition is satisfied after the preceding vehicle recognizing unit has detected that the preceding vehicle has moved in the vehicle transverse direction, the trajectory tracking control unit does not cause the driver's own vehicle to follow the trajectory of the preceding vehicle, in the case it is determined that the preceding vehicle recognized by the preceding vehicle recognizing unit has overlapped with the lane marking imaginary line. According to the present invention, even if the original lane markings cannot be recognized due to rubbing-off or the like of the lane markings, the lane deviation of the preceding vehicle can be recognized by the lane marking imaginary line and the movement in the vehicle transverse direction of the preceding vehicle. Therefore, the driver's own vehicle can be made not to follow the preceding vehicle that is undertaking the lane deviation.

In the present invention, the imaginary line setting unit may predict and set the lane marking imaginary line based on the lane markings recognized by the lane marking recognizing unit. Thus, according to the present invention, it is possible for the lane marking imaginary line to be set accurately.

According to the present invention, the preceding vehicle undertaking a lane deviation can accurately and reliably be recognized, and the driver's own vehicle can be controlled so as not to follow the preceding vehicle that is making the lane deviation.

The above and other objects, features, and advantages of the present invention will become more apparent from the following description when taken in conjunction with the accompanying drawings, in which preferred embodiments of the present invention are shown by way of illustrative example.

BRIEF DESCRIPTION OF THE DRAWINGS

FIG. 1 is a functional block diagram of a driving support device according to a first embodiment of the present invention;

FIG. 2 is a state transition diagram of a driving support control carried out according to the first embodiment;

FIG. 3 is a functional block diagram of a driving support device according to a second embodiment of the present invention;

FIG. 4 is a state transition diagram of a driving support control carried out according to the second embodiment; and FIG. 5 is a state transition diagram of a driving support control carried out according to a modification of the first embodiment.

DESCRIPTION OF THE PREFERRED EMBODIMENTS

Preferred embodiments of a driving support device according to the present invention will be described in detail below with reference to the accompanying drawings.

First Embodiment

<Configuration of Driving Support Device 12>

The configuration of the driving support device 12 will be described using FIG. 1. The driving support device 12 includes a recognition controller 20 that recognizes objects and the environment in front of a driver's own vehicle 10 based on information acquired through a camera 14 and a radar system 16, a steering controller 22 that performs a process in relation to steering of the driver's own vehicle 10, a traveling controller 24 that performs a process in relation to traveling of the driver's own vehicle 10, a steering unit 26 that is operated responsive to a steering command output from the steering controller 22, a drive unit 28 that is operated responsive to an acceleration command output from the traveling controller 24, and a brake unit 30 that is operated responsive to a deceleration command output from the traveling controller 24.

The camera 14 captures images of lane markings and objects, for example, a preceding vehicle or the like in front of the driver's own vehicle 10, and thereby acquires image information. As the camera 14, there can be used either a monocular camera or a stereo camera. The radar system 16 detects objects such as a preceding vehicle in front of the driver's own vehicle 10 using electromagnetic waves or ultrasonic waves. As the radar system 16, there can be used devices such as a millimeter-wave radar, a microwave radar, a laser radar, an infrared sensor, an ultrasonic sensor, or the like. A vehicle velocity sensor 18 detects a velocity V of the driver's own vehicle 10.

The recognition controller 20 is constituted from an ECU. The ECU comprises a computer such as a microcomputer or the like, and includes a central processing unit (CPU), a read only memory (a ROM including an EEPROM) and a random access memory (RAM) that serve as memories, input and output devices such as an A/D converter, a D/A converter, etc., and a timer that serves as a timing unit. By the CPU reading out and executing programs stored in the ROM, the ECU functions as various function realizing units (function realizing means), for example, various controllers and control units, a calculating unit, and a processing unit, etc. According to the present embodiment, the ECU that constitutes the recognition controller 20 functions as a lane marking recognizing unit 32 and a preceding vehicle recognizing unit 34. The ECU may be divided into a plurality of units, or may be integrated with another ECU.

The lane marking recognizing unit 32 is configured so as to recognize objects and environmental information in front of the driver's own vehicle 10 based on the image information acquired from the camera 14. Lane markings on road surfaces are recognized by the lane marking recognizing unit 32. Widely known algorithms can be used in the recognition process. The preceding vehicle recognizing unit 34 is configured so as to recognize a preceding vehicle based on image information from the camera 14 or detection information from the radar system 16. For example, based on reflected waves of a millimeter wave radar, the preceding vehicle recognizing unit 34 is configured so as to recognize the position of a preceding vehicle that is positioned in front of the driver's own vehicle 10, the distance (hereinafter referred to as an intravehicular distance) to the preceding vehicle from the driver's own vehicle 10, and the relative velocity between the driver's own vehicle 10 and the preceding vehicle, etc.

The steering controller 22 is constituted from an ECU. According to the present embodiment, the ECU that constitutes the steering controller 22 functions as a control management unit 36, a lane maintenance control unit 40, and a trajectory tracking control unit 42. The control management unit 36 is configured so as to determine whether to carry out the lane maintenance control, whether to carry out the trajectory tracking control, and whether none of the driving support controls should be carried out, based on information acquired from the lane marking recognizing unit 32 and the preceding vehicle recognizing unit 34. The lane maintenance control unit 40 is configured so as to carry out various computations for the purpose of maintaining the driver's own vehicle 10 within a lane along the lane markings. The trajectory tracking control unit 42 is configured so as to carry out various computations for the purpose of causing the driver's own vehicle 10 to follow the trajectory of the preceding vehicle.

The traveling controller 24 is constituted from an ECU. According to the present embodiment, the ECU that constitutes the traveling controller 24 functions as a vehicle velocity control unit 48. The vehicle velocity control unit 48 is configured so as to carry out various computations for the purpose of causing the driver's own vehicle 10 to travel while the vehicle velocity V thereof being adjusted to that of the preceding vehicle, and for maintaining the intravehicular distance corresponding to the vehicle velocity V. The traveling controller 24 is further equipped with a vehicle velocity storage unit 50. The vehicle velocity storage unit 50 stores a maximum vehicle velocity Vmax that defines an upper limit value of the vehicle velocity V.

The steering unit 26, the drive unit 28, and the brake unit 30 are all constituted from ECUs. The steering unit 26 operates a motor 56 responsive to steering commands transmitted thereto from the steering controller 22. The motor 56 rotates a steering shaft (not shown) in one direction or the other. The drive unit 28 operates a drive source 58 responsive to acceleration commands transmitted thereto from the traveling controller 24. If the driver's own vehicle 10 is an engine-driven vehicle, a throttle valve or the like is operated responsive to the acceleration command, and thereby the drive source (engine) 58 is operated. If the driver's own vehicle 10 is an electric vehicle that includes an electric motor, the drive source (electric motor) 58 is operated responsive to the acceleration command. The brake unit 30 operates a brake actuator responsive to a deceleration command transmitted from the traveling controller 24, and thereby a brake 60 is operated.

<Transitions of the Driving Support Control>

Transitions of the driving support control in the control management unit 36 will be described using FIG. 2. As has been described above, the control management unit 36 is configured so as to determine whether to carry out the lane maintenance control, whether to carry out the trajectory tracking control, and whether none of the driving support controls should be carried out. As a condition for the control management unit 36 implementing the lane maintenance control and the trajectory tracking control, recognition of the preceding vehicle is essential. For this purpose, in the event that the preceding vehicle is not recognized by the preceding vehicle recognizing unit 34, the control management unit 36 does not allow implementation of the driving support controls.

As shown in FIG. 2, the control management unit 36 switches appropriately between a state S0 in which no driving support controls are carried out, a state S1 in which the lane maintenance control is carried out, and a state S2 in which the trajectory tracking control is carried out. During switching, the following conditions 1 through 6 are determined.

Condition 1: A preceding vehicle exists.
Condition 2: A preceding vehicle does not exist.
Condition 3: Lane markings are recognized.
Condition 4: Lane markings are not recognized.
Condition 5: The preceding vehicle is moving in the vehicle transverse direction.
Condition 6: The preceding vehicle is not moving in the vehicle transverse direction.

The control management unit 36 determines conditions 1 and 2 based on recognition information of the preceding vehicle recognizing unit 34. Further, the control management unit 36 determines conditions 3 and 4 based on recognition information of the lane marking recognizing unit 32. Further, the control management unit 36 determines whether the preceding vehicle is moving in the vehicle transverse direction or not, i.e., conditions 5 and 6, based on the recognition information of the preceding vehicle recognizing unit 34. For example, a movement amount determination value may be provided for the purpose of determining whether the preceding vehicle is moving in the vehicle transverse direction or not. In the case that the movement amount is greater than the determination value therefor, it can be determined that the preceding vehicle is moving in the vehicle transverse direction. Alternatively, it can also be determined that the preceding vehicle is moving in the vehicle transverse direction, if the distance between one of the lane markings and the preceding vehicle is greater than or equal to a predetermined distance.

<<Transition from State S0 to State S1>>

In state S0, in which no driving support controls are carried out, in the case that condition 1 and condition 3 are satisfied, the control management unit 36 switches to state S1, in which the lane maintenance control is carried out. At this time, the lane maintenance control unit 40 transmits steering commands to the steering unit 26. The steering unit 26 operates the motor 56 responsive to the steering commands. In this manner, the driver's own vehicle 10 is assisted (supported) in driving by the lane maintenance control.

<<Transition from State S1 to State S0>>

In state S1, in which the lane maintenance control is carried out, in the case that condition 4 is satisfied after condition 5 has been satisfied, the control management unit 36 switches to state S0, in which no driving support controls are carried out. Stated otherwise, in the event that the lane markings are no longer recognized after the preceding vehicle has moved in the vehicle transverse direction, the control management unit 36 predicts that the preceding vehicle will depart from the lane in which it is traveling, and halts the lane maintenance control.

Further, in state S1, in which the lane maintenance control is carried out, in the case that condition 2 is satisfied, the control management unit 36 switches to state S0, in which no driving support controls are carried out. As has been described above, according to the present embodiment, recognition of the preceding vehicle is regarded as a condition for implementing the driving support control. Therefore, in the case that a preceding vehicle cannot be recognized, even if the lane markings are recognized, the lane maintenance control is halted.

<<Transition from State S0 to State S2>>

In state S0, in which no driving support controls are carried out, in the case that condition 1 and condition 4 are satisfied, the control management unit 36 switches to state S2, in which the trajectory tracking control is carried out. At this time, the trajectory tracking control unit 42 transmits steering commands to the steering unit 26. The steering unit 26 operates the motor 56 responsive to the steering commands. In this manner, the driver's own vehicle 10 is assisted (supported) in driving by the trajectory tracking control.

In the case that the preceding vehicle which has made a lane deviation is recognized again as the preceding vehicle, it is confirmed that the preceding vehicle is traveling stably in the same lane as the driver's own vehicle 10. For example, after having confirmed that the preceding vehicle is traveling in the same lane as the driver's own vehicle 10, the trajectory tracking control is restricted until a predetermined time has elapsed.

<<Transition from State S2 to State S0>>

In state S2, in which the trajectory tracking control is carried out, in the case that condition 2 is satisfied, the control management unit 36 switches to state S0, in which no driving support controls are carried out. As has been described above, according to the present embodiment, recognition of the preceding vehicle is regarded as a condition for implementing the driving support control. Therefore, in the case that a preceding vehicle cannot be recognized, even if the lane markings are recognized, the trajectory tracking control is halted.

<<Transition from State S1 to State S2>>

In state S1, in which the lane maintenance control is carried out, in the case that condition 6 and condition 4 are satisfied, the control management unit 36 switches to state S2, in which the trajectory tracking control is carried out. At this time, the trajectory tracking control unit 42 transmits steering commands to the steering unit 26. The steering unit 26 operates the motor 56 responsive to the steering commands. In this manner, the driver's own vehicle 10 is assisted (supported) in driving by the trajectory tracking control.

<<Transition from State S2 to State S1>>

In state S2, in which the trajectory tracking control is carried out, in the case that condition 3 is satisfied, the control management unit 36 switches to state S1, in which the lane maintenance control is carried out. At this time, the lane maintenance control unit 40 transmits steering commands to the steering unit 26. The steering unit 26 operates the motor 56 responsive to the steering commands. In this manner, the driver's own vehicle 10 is assisted (supported) in driving by the lane maintenance control.

Summary of First Embodiment

The driving support device 12 according to the first embodiment is equipped with the preceding vehicle recognizing unit 34 that recognizes a preceding vehicle, the lane marking recognizing unit 32 that recognizes lane markings of the lane in which the driver's own vehicle 10 travels, the lane maintenance control unit 40 that controls the driver's own vehicle 10 so as to remain within the lane along the lane markings recognized by the lane marking recognizing unit 32, and the trajectory tracking control unit 42 which, in the case that a predetermined condition (condition 4) is satisfied, controls the driver's own vehicle 10 so as to follow the trajectory of the preceding vehicle recognized by the preceding vehicle recognizing unit 34. In addition, after it has been detected by the preceding vehicle recognizing unit 34 that the preceding vehicle has moved in the vehicle transverse direction (condition 5), and even if the predetermined condition (condition 4) is satisfied, the trajectory tracking control unit 42 does not cause the driver's own vehicle 10 to follow the trajectory of the preceding vehicle.

In this manner, in the first embodiment, based on a movement of the preceding vehicle incidental to a lane deviation thereof, i.e., based on movement of the preceding vehicle in the vehicle transverse direction, it is predicted that the preceding vehicle will make a lane deviation. In addition, in the case that a lane deviation of the preceding vehicle is predicted, even if a predetermined condition (condition 4) for carrying out the trajectory tracking control has been satisfied, trajectory tracking is not actually carried out. According to the first embodiment, the preceding vehicle undertaking a lane deviation can accurately and reliably be recognized, and the driver's own vehicle 10 can be made not to follow the preceding vehicle that is making the lane deviation.

Further, in the first embodiment, the predetermined condition (condition 4) is that the lane markings are no longer recognized by the lane marking recognizing unit 32. When the lane maintenance control is being carried out premised on recognition of the preceding vehicle, if the lane markings are no longer recognized, then the driver's own vehicle 10 transitions to the trajectory tracking control. However, in the case that the reason as to why the lane markings are no longer recognized is because the lane markings are straddled over accompanying the lane deviation of the preceding vehicle, if the driver's own vehicle 10 were to transition to the trajectory tracking control, the driver's own vehicle 10 also would undertake a lane deviation. According to the first embodiment, if the preceding vehicle moves in the vehicle transverse direction (condition 5) before the lane markings can no longer be recognized, it is predicted that the preceding vehicle will deviate from the lane. In this manner, according to the present invention, the preceding vehicle undertaking a lane deviation can accurately and reliably be recognized, and the driver's own vehicle 10 can be made not to follow the preceding vehicle that is making the lane deviation.

Second Embodiment

<Configuration of Driving Support Device 12*a*>

The configuration of the driving support device 12*a* will be described using FIG. 3. Many of the structural features of the driving support device 12*a* are the same as those of the structural features of the driving support device 12 shown in FIG. 1. Therefore, the same reference characters are designated with respect to the same structural elements, and description of such features is omitted.

The portion that differs between the driving support device 12*a* and the driving support device 12 is the provision of an imaginary line setting unit 62 of the steering controller 22*a*. In the event that the lane markings are not recognized by the lane marking recognizing unit 32, or in the event that the accuracy in recognizing the lane markings is low, the imaginary line setting unit 62 sets a lane marking imaginary line. For example, in a state in which the preceding vehicle is recognized, cases occur in which one-side marking of the lane markings is recognized, whereas the other-side marking of the lane markings is not recognized. The imaginary line setting unit 62 predicts and sets the lane marking imaginary line based on the lane marking that is recognized by the lane marking recognizing unit 32. For example, a center line through the lane is taken as an axis of symmetry, and the lane marking imaginary line is set to be line-symmetrical with the one-side lane marking that is recognized by the lane marking recognizing unit 32.

<Transitions of the Driving Support Control>

Transitions of the driving support control in the control management unit 36*a* will be described using FIG. 4. The transition diagram shown in FIG. 4 includes the following additional conditions, i.e., condition 7 and condition 8, in addition to those of the transition diagram shown in FIG. 2.

Condition 7: Lane marking imaginary line is set.

Condition 8: Preceding vehicle overlaps with the lane marking imaginary line.

Similar to the control management unit 36 shown in FIG. 1, the control management unit 36*a* determines conditions 1 and 2 based on recognition information of the preceding vehicle recognizing unit 34. Further, the control management unit 36*a* determines conditions 3 and 4 based on recognition information of the lane marking recognizing unit 32. Further, the control management unit 36*a* determines whether the preceding vehicle is moving in the vehicle transverse direction or not, i.e., conditions 5 and 6, based on the recognition information of the preceding vehicle recognizing unit 34. Further, the control management unit 36*a* determines condition 7 by the lane marking imaginary line having been set by the imaginary line setting unit 62. Further, the control management unit 36a determines condition 8 based on the recognition information of the preceding vehicle recognizing unit 34 and the lane marking imaginary line that was set by the imaginary line setting unit 62.

Transitions of the driving support control in the control management unit 36a (FIG. 4) and transitions of the driving support control in the control management unit 36 (FIG. 2) are the same in terms of the judgment condition for transitioning from state S0 to state S1, the judgment condition for transitioning from state S0 to state S2, and the judgment condition for transitioning from state S2 to state S1. Therefore, descriptions of such transitions are omitted, and descriptions will be made concerning transitioning from state S1 to state S0, transitioning from state S2 to state S0, and transitioning from state S1 to state S2.

<<Transition from State S1 to State S0>>

In state S1, in which the lane maintenance control is carried out, in the case that condition 4 or condition 7 is satisfied after condition 5 has been satisfied, the control management unit 36a switches to state S0, in which no driving support controls are carried out. In the case that the lane markings are no longer recognized after the preceding vehicle has moved in the vehicle transverse direction, or in the case that the lane marking imaginary line is set after the preceding vehicle has moved in the vehicle transverse direction, the control management unit 36a predicts that the preceding vehicle is undertaking a lane deviation, and the lane maintenance control is halted.

In this case, the addition of the lane marking imaginary line setting as a judgment condition (condition 7) is for the following reasons. The lane marking imaginary line is set in the case that the lane markings are no longer recognized. At this time, it cannot be determined whether the reason as to why the lane markings are not recognized is due to the disappearance of the lane markings themselves, or because the preceding vehicle is straddling over the lane markings. Therefore, the case that the lane marking imaginary line is set, is regarded as being equivalent to the case that the lane markings could not be recognized due to the preceding vehicle straddling over the lane markings.

Further, in state S1, in which the lane maintenance control is carried out, in the case that condition 2 is satisfied, the control management unit 36a switches to state S0, in which no driving support controls are carried out. In the same manner as the first embodiment, according to the second embodiment as well, recognition of the preceding vehicle is regarded as a condition for implementing the driving support control. Therefore, in the case that a preceding vehicle cannot be recognized, even if the lane markings are recognized, the lane maintenance control is halted.

<<Transition from State S2 to State S0>>

In state S2, in which the trajectory tracking control is carried out, in the case that condition 2 is satisfied, the control management unit 36a switches to state S0, in which no driving support controls are carried out. In the same manner as the first embodiment, according to the second embodiment as well, recognition of the preceding vehicle is regarded as a condition for implementing the driving support control. Therefore, in the case that a preceding vehicle cannot be recognized, even if the lane markings are recognized, the trajectory tracking control is halted.

Further, in state S2, in which the trajectory tracking control is carried out, in the case that condition 8 is satisfied after condition 5 has been satisfied, the control management unit 36a switches to state S0, in which no driving support controls are carried out. In the case that the preceding vehicle overlaps with the lane marking imaginary line after having moved in the vehicle transverse direction, the control management unit 36a predicts that the preceding vehicle is undertaking a lane deviation, and the lane maintenance control is halted.

<<Transition from State S1 to State S2>>

In state S1, in which the lane maintenance control is carried out, in the case that condition 6 and condition 4, or condition 6 and condition 7 are satisfied, the control management unit 36a switches to state S2, in which the trajectory tracking control is carried out. At this time, the trajectory tracking control unit 42 transmits steering commands to the steering unit 26. The steering unit 26 operates the motor 56 responsive to the steering commands. In this manner, the driver's own vehicle 10a is assisted (supported) in driving by the trajectory tracking control.

Summary of Second Embodiment

The driving support device 12a according to the second embodiment is equipped with the imaginary line setting unit 62 which, in the case that the predetermined condition (condition 4) is satisfied, sets the lane marking imaginary line to the vehicle transverse direction in which the preceding vehicle moves. In addition, even if the predetermined condition (condition 4) is satisfied after the preceding vehicle recognizing unit 34 has detected that the preceding vehicle has moved in the vehicle transverse direction, the trajectory tracking control unit 42 does not cause the driver's own vehicle 10a to follow the trajectory of the preceding vehicle, in the case it is determined that the preceding vehicle recognized by the preceding vehicle recognizing unit 34 has overlapped with the lane marking imaginary line. According to the second embodiment, even if the original lane markings cannot be recognized due to rubbing-off or the like of the lane markings, the lane deviation of the preceding vehicle can be recognized by the lane marking imaginary line and the movement in the vehicle transverse direction of the preceding vehicle. Therefore, the driver's own vehicle 10a can be made not to follow the preceding vehicle that is undertaking the lane deviation.

Further, the imaginary line setting unit 62 predicts and sets the lane marking imaginary line based on the lane marking that is recognized by the lane marking recognizing unit 32. Therefore, it is possible for the lane marking imaginary line to be set accurately.

In both the first and second embodiments, state S1 (the lane maintenance control) is carried out premised on recognition of the preceding vehicle (condition 1). However, the invention is not limited to this feature, and the condition for carrying out state S1 can be based only on recognition of the lane markings (condition 3). For example, as shown in FIG. 5, the control management unit 36 carries out switching from state S0 to state S1 only on the basis of recognition of the lane markings (condition 3), regardless of recognition or non-recognition of the preceding vehicle. In state S1, in the case that the lane markings cannot be recognized (condition 4), if the preceding vehicle can be recognized and condition 6 is satisfied, the control management unit 36 carries out switching from state S1 to state S2. Moreover, in the present embodiment, the condition of switching from state S1 to state S0 is treated as satisfying condition 2 and condition 4. Even with such an embodiment, the same effects and advantages of the first and second embodiments can be obtained.

Although with the first and second embodiments, the controls are carried out based on the lane markings in state S1, the invention is not limited to this feature, and in state S1, it is possible to perform trajectory tracking such that the driver's own vehicle does not extend or protrude beyond the lane markings. More specifically, while performing the trajectory tracking control by performing the trajectory tracking control premised on the lane markings being recognized in state S1, a control is performed by trajectory tracking such that the lane is not changed, and in state S2, the trajectory tracking control is carried out in a state in which the lane markings are not recognized.

While the invention has been particularly shown and described with reference to preferred embodiments, it will be understood that variations and modifications can be effected thereto by those skilled in the art without departing from the scope of the invention as defined by the appended claims.

What is claimed is:

1. A driving support device comprising:
   a preceding vehicle recognizing unit configured to recognize a preceding vehicle;
   a lane marking recognizing unit configured to recognize a lane marking of a lane in which the driver's own vehicle travels;
   a lane maintenance control unit configured to maintain the driver's own vehicle within a lane along the lane marking recognized by the lane marking recognizing unit; and
   a trajectory tracking control unit configured to, in a case that the lane marking is not recognized, control the driver's own vehicle so as to follow a trajectory of the preceding vehicle that has been recognized by the preceding vehicle recognizing unit;
   wherein, if the lane marking is not recognized subsequently to a detection by the preceding vehicle recognizing unit that the preceding vehicle has moved in a vehicle transverse direction, the trajectory tracking control unit does not cause the driver's own vehicle to follow the trajectory of the preceding vehicle.

2. The driving support device according to claim 1, further comprising:
   an imaginary line setting unit configured to, in a case that the predetermined condition is satisfied, set a lane marking imaginary line to the vehicle transverse direction in which the preceding vehicle moves;
   wherein, even if the predetermined condition is satisfied after the preceding vehicle recognizing unit has detected that the preceding vehicle has moved in the vehicle transverse direction, the trajectory tracking control unit does not cause the driver's own vehicle to follow the trajectory of the preceding vehicle, in a case it is determined that the preceding vehicle recognized by the preceding vehicle recognizing unit has overlapped with the lane marking imaginary line.

3. The driving support device according to claim 2, wherein the imaginary line setting unit predicts and sets the lane marking imaginary line based on the lane marking recognized by the lane marking recognizing unit.

4. The driving support device according to claim 1, further comprising:
   an imaginary line setting unit configured to, in a case that the predetermined condition is satisfied, set a lane marking imaginary line to the vehicle transverse direction in which the preceding vehicle moves;
   wherein, even if the predetermined condition is satisfied after the preceding vehicle recognizing unit has detected that the preceding vehicle has moved in the vehicle transverse direction, the trajectory tracking control unit does not cause the driver's own vehicle to follow the trajectory of the preceding vehicle, in a case it is determined that the preceding vehicle recognized by the preceding vehicle recognizing unit has overlapped with the lane marking imaginary line.

5. The driving support device according to claim 4, wherein the imaginary line setting unit predicts and sets the lane marking imaginary line based on the lane marking recognized by the lane marking recognizing unit.

* * * * *